(12) United States Patent
Giannakakos

(10) Patent No.: US 6,726,422 B2
(45) Date of Patent: Apr. 27, 2004

(54) HELICALLY COILED TITANIUM WIRE FASTENER INSERTS

(75) Inventor: William Giannakakos, Danbury, CT (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/000,869

(22) Filed: Nov. 2, 2001

(65) Prior Publication Data

US 2003/0086772 A1 May 8, 2003

(51) Int. Cl.[7] ................................................. F16B 37/12
(52) U.S. Cl. ........................................ 411/438; 411/178
(58) Field of Search ................................ 411/438, 432, 411/178

(56) References Cited

U.S. PATENT DOCUMENTS

| | | | | |
|---|---|---|---|---|
| 3,682,508 A | * | 8/1972 | Briles | 411/176 |
| 4,645,398 A | * | 2/1987 | Cosenza et al. | 411/438 |
| 6,146,073 A | * | 11/2000 | Kobusch | 411/178 |
| 6,152,935 A | * | 11/2000 | Kammerer et al. | 606/144 |
| 6,171,040 B1 | | 1/2001 | Sato | |
| 6,224,311 B1 | * | 5/2001 | Lutkus et al. | 411/178 |
| 6,344,127 B1 | * | 2/2002 | Itoh | 205/171 |
| 6,447,524 B1 | * | 9/2002 | Knodel et al. | 606/151 |

FOREIGN PATENT DOCUMENTS

JP  2000-138055  5/2000

* cited by examiner

Primary Examiner—Flemming Saether
Assistant Examiner—Jori Schiffman
(74) Attorney, Agent, or Firm—Harness, Dickey & Pierce, P.L.C.

(57) ABSTRACT

Described herein are fastener inserts formed from a titanium alloy which reduce corrosion in a fastener assembly. In addition to reduced corrosion, particularly galvanic corrosion, the fastener insert is lightweight and provides improved strength to weight ratios as compared to stainless steel fastener inserts.

20 Claims, 3 Drawing Sheets

HELICALLY COILED TITANIUM WIRE FASTENER INSERTS

BACKGROUND OF THE INVENTION

The present invention relates to fastener inserts and, more particularly, to helically coiled titanium wire fastener inserts which are useful in both substrates having tapped holes and nut assemblies.

Fastener assemblies come in a variety of shapes, sizes, designs and materials. Many fastening assemblies include not only a fastener such as a bolt, pin or screw, but also will include a fastener insert to be positioned within a tapped hole of a substrate or threaded nut barrel. One specific type of fastener insert useful in association with a threaded fastener is the helically coiled wire insert as described in U.S. Pat. No. 2,672,070 entitled "Wire Coil Screw Thread Insert for Molded Material".

Generally speaking, tapped threads are strengthened due to the inherent flexibility of such helically coiled wire inserts since the insert provides a more balanced distribution of dynamic and static loads throughout the length of thread engagement. This flexibility also compensates for variation in lead and angle error.

Since helically coiled inserts generally do not exhibit crimping, staking, locking or swaging and do not require keying in place, helically coiled wire inserts greatly reduce stress which would otherwise be transferred to the receiving substrate. While such helically coiled wire inserts are generally useful as anchoring mechanisms for threaded fasteners, in order to be used in high strength applications, such inserts must be formed from high strength materials. Heretofore, 302/304 stainless steels have been used to manufacture fastener inserts.

The use of stainless steel inserts in fastener assemblies wherein the nut and/or fasteners are formed from other alloys leads to certain perceived problems such as corrosion, generally, and galvanic corrosion, in particular. By the phrase "galvanic corrosion", it is meant the electrochemical corrosion resulting from the current caused in a galvanic cell between two dissimilar metals in an electrolyte because of the difference in potential (emf) of the two metals.

Stainless steel fastener inserts have been coated with zinc chromate in an effort to prevent galvanic corrosion. However, application of the zinc chromate requires strict quantitative controls and is considered labor intensive. The application of too much zinc chromate can restrict movement. Additionally, the installation tools would require frequent cleaning to prevent build up of the zinc chromate on mandrels of the tool which is undesirable. The application of too little zinc chromate leads to certain other problems such as inadequate corrosion protection, for example.

Another recent approach to preventing galvanic corrosion in tapped holes is described in co-pending U.S. application Ser. No. 09/356,988. According to this document, improvements in preventing galvanic corrosion were seen as a result of coating fastener inserts made from stainless steel with a fluoropolymer composition. The additional step of applying a coating, sealant or plating to the insert can lead to added expense in the manufacturing process.

SUMMARY OF THE INVENTION

It is therefore a primary object of the present invention to provide titanium alloy fastener inserts which tend to limit, if not eliminate, galvanic corrosion in fastener assemblies.

Still another object of the present invention is to provide titanium alloy fastener inserts which are significantly lighter in weight than similarly sized and shaped stainless steel fastener inserts, e.g., improved strength to weight ratios.

To accomplish these objectives, among others, the present invention relates to a fastener inserts including a body formed from a titanium alloy comprising at least about 50.0 wt. % titanium, preferably 60.0 wt. % titanium, and, still more preferably, at least about 70.0 wt. % titanium. In addition to the titanium component, the alloy may include one or more of nitrogen, carbon, hydrogen, iron, oxygen, aluminum, vanadium, tin, ruthenium, palladium, cobalt, molybdenum, chromium, nickel, niobium, zirconium, silicon, hafnium, bismuth, yttrium, copper, tantalum, boron, manganese and tungsten.

As the alloy is being formed into a wire, the wire may be shaped to a desirable cross-sectional geometry and subsequently coiled. After allowing the wire to cool to approximately 23° C., the wire may be heat treated as will be described in greater detail below to obtain specific tensile hardness and torque values. The resulting fastener inserts should have excellent corrosion resistance, be lightweight and provide superior strength.

DETAILED DESCRIPTION OF THE DRAWINGS

DETAILED DESCRIPTION OF THE INVENTION

Figure 1:
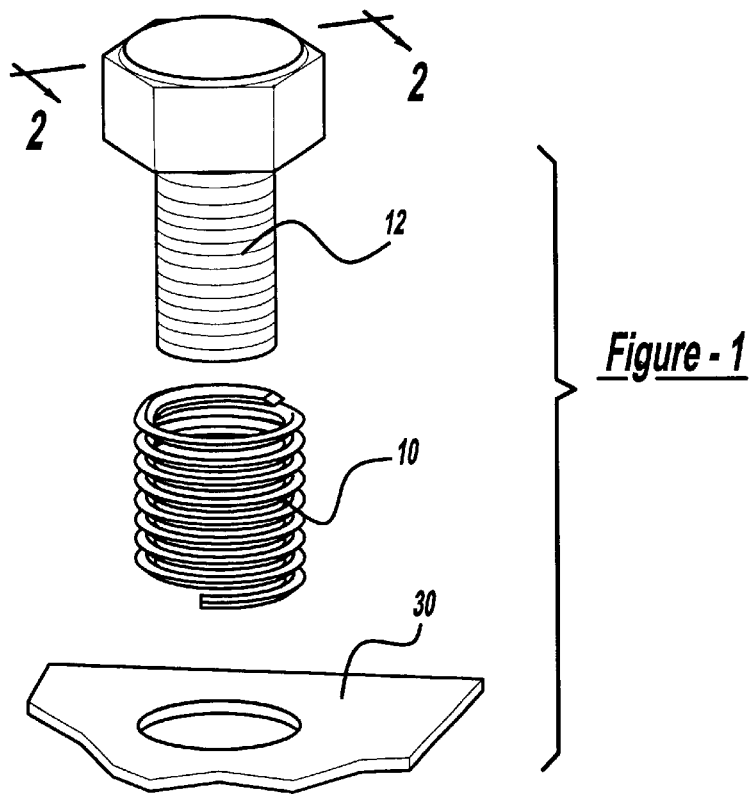
FIG. 1 is a blown apart perspective view of a fastener assembly including a helically wound titanium alloy fastener insert.
Figure 2:
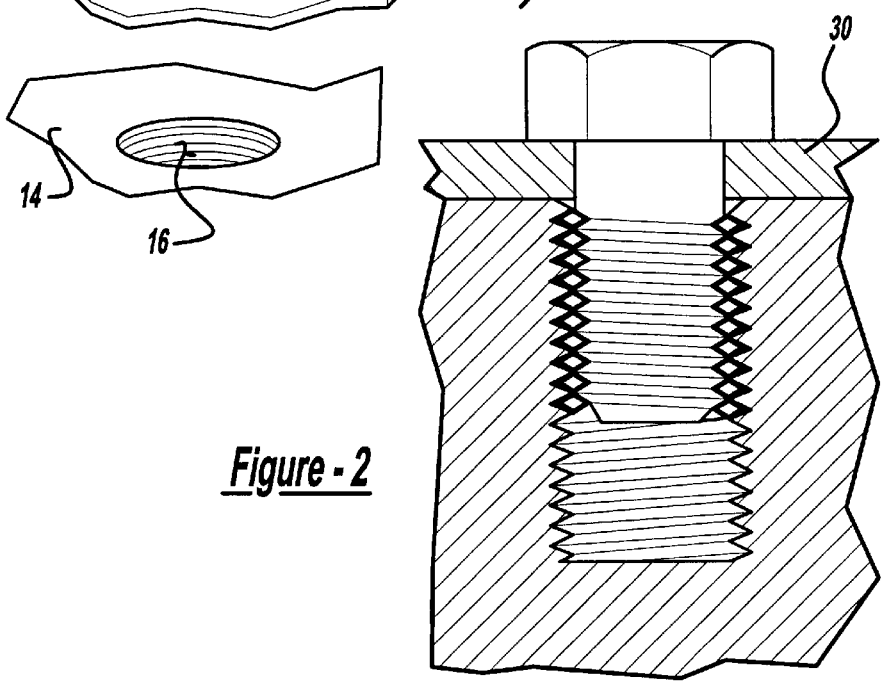
FIG. 2 is an assembly view in cross-section of the fastener assembly of FIG. 1.
Figure 5:
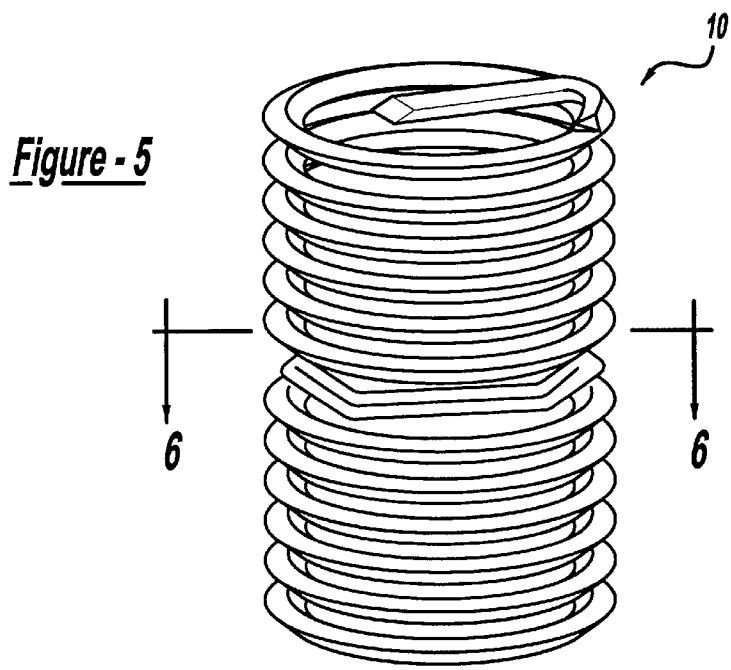
FIG. 5 is a perspective view of a locking titanium alloy fastener insert.

Referring to FIGS. 1–2, there is shown an insert 10 formed from a titanium alloy in accordance with the teachings of the present invention. The fastener insert, which may be of a variety of shapes and sizes, is shown to be in the form of a helically coiled wire to be used in association with a threaded fastener 12. As shown, the insert is of the free running variety as opposed to a locking fastener insert which may be useful for certain types of fastener assemblies. The fastener insert is positioned within a threaded aperture or tapped hole 16 provided along a substrate 14 to secure an object 30 in combination with the fastener. By free running, it is meant that the titanium insert has substantially symmetrical helical coil over its entire length, whereas a locking fastener insert includes at least one non-symmetrical convolution, usually including straight segments as illustrated in FIG. 5.

Preferably, the fastener inserts 10 are manufactured such that they are larger in diameter, before installation, than the tapped holes within which they are employed to ensure that they become firmly secured. For helically wound fastener inserts, it is preferable that the coils have about a 60° internal screw thread convolution which can accommodate virtually any standard threaded bolt or screw. Additionally, the fastener inserts may include a removable or break away tang which is useful during the insertion process.

Figures 3, 4:
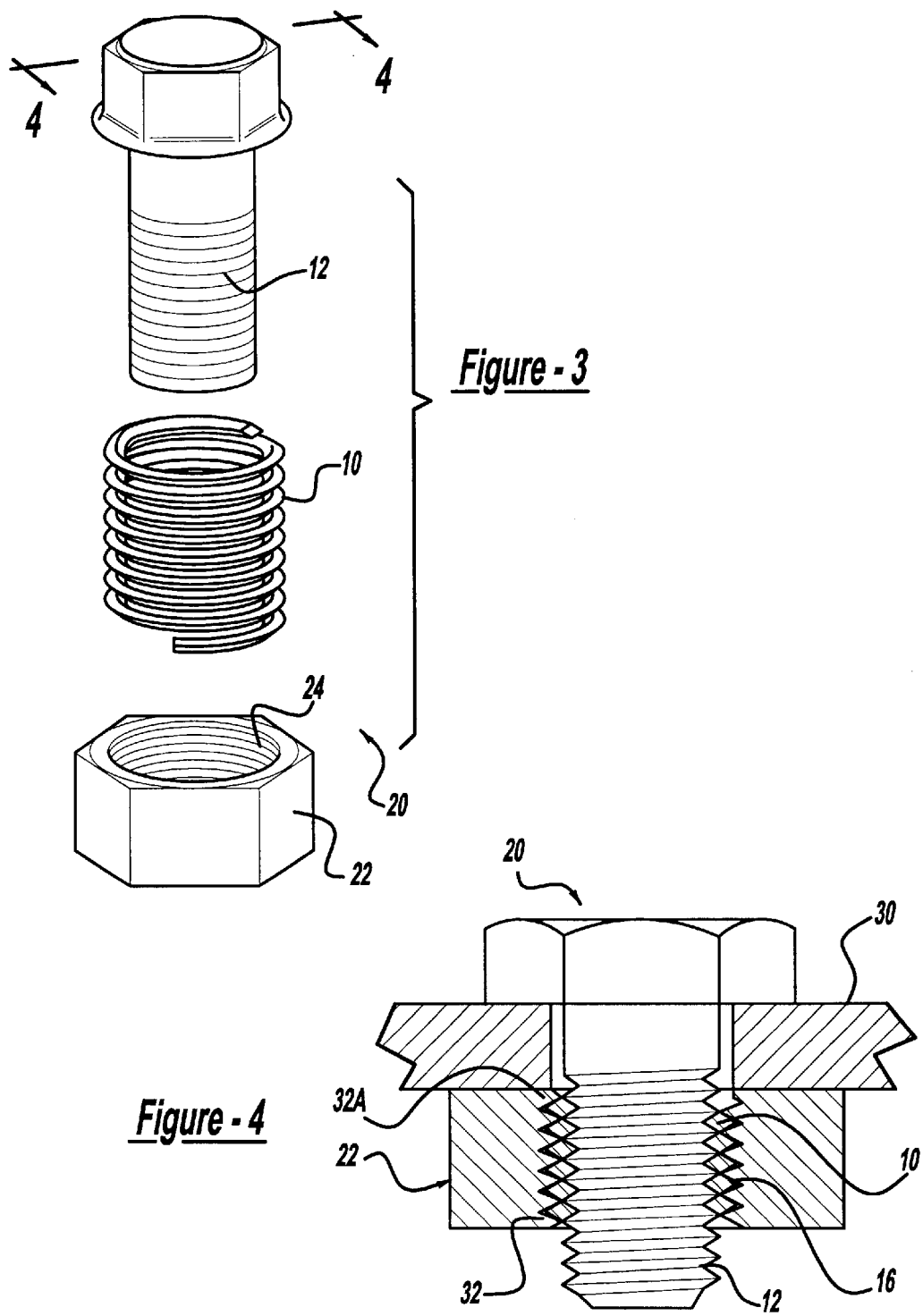
FIG. 3 is a blown apart perspective view of a nut assembly including a helically wound titanium alloy fastener insert.
FIG. 4 is an assembly view in cross-section of the nut assembly of FIG. 3.

Referring to FIGS. 3 and 4, a nut assembly 20 incorporating a titanium fastener insert 10 is shown. The nut assembly may include either a free running or a locking fastener insert as needed and described above. The nut 22, which may be made on a conventional nut making machine, includes a barrel 24 of generally constant pitch and diameter throughout. Upon installing the insert 10 within the nut barrel 24, the internal threads of the nut may be deformed at each end 32 and 32A, respectively, to prevent the insert from becoming disengaged from the nut.

Upon forming the nut assembly 20, a fastener such as a threaded bolt or a stud can be inserted into the nut including the fastener insert to retain an object 30. The nut assembly not only is resistant to galvanic corrosion as defined above, but also provides a more uniform torque and more accurate preload or clamp up.

Figure 6:
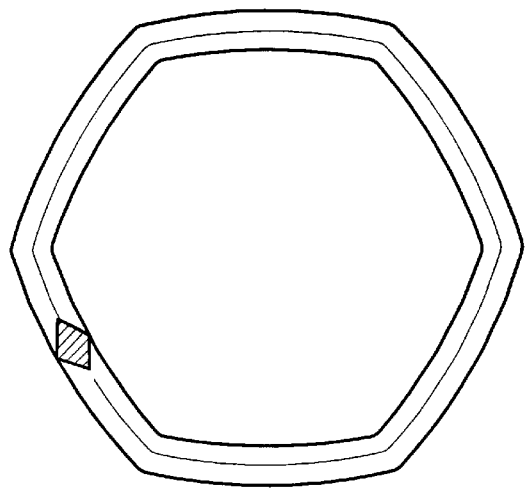
FIG. 6 is a sectional view of a titanium alloy fastener insert along a locking segment.
Figure 7:
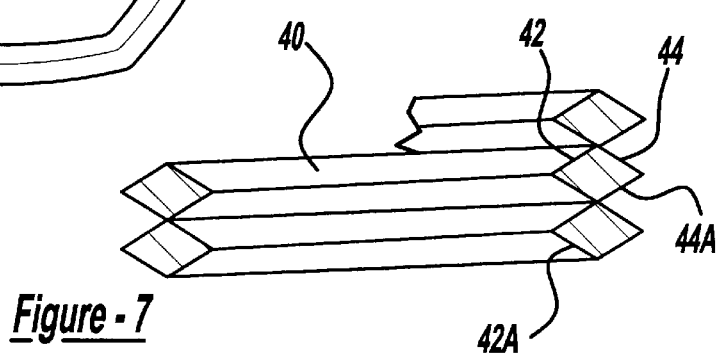
FIG. 7 is a front sectional view of a fastener insert illustrating a preferred cross-sectional dimension.

As illustrated with reference to FIGS. 5 and 6, a preferred fastener insert embodiment includes multiple convolutions 40 having angled interior walls 42 and 42A. The combination of complementarily angled interior walls serve to tightly mate with the threads 18 provided along the fastener 12 as shown in FIGS. 2 and 4.

Under a highly preferred embodiment, multiple convolutions also have angled exterior walls 44 and 44A to tightly engage the threads of a tapped hole 16 or nut 22 depending on use. As the angled interior and exterior walls typically run along the same fastener insert convolution, a plurality of the convolutions tend to have a substantially diamond shape in cross section.

To form the fastener inserts useful in association with the above described embodiments, a titanium alloy comprising at least about 50.0 wt. % and, more preferably, at least about 60.0 wt. % titanium and, still more preferably, at least about 70.0 wt. % titanium is employed. In addition to the titanium component, the alloy may include one or more of nitrogen, carbon, hydrogen, iron, oxygen, aluminum, vanadium, tin, ruthenium, palladium, cobalt, molybdenum, chromium, nickel, niobium, zirconium, silicon, hafnium, bismuth, yttrium, copper, tantalum, boron, manganese and tungsten.

Under a preferred embodiment, the fastener insert will be formed from a titanium alloy comprising:

a) at least about 60.0 wt. % titanium;

b) between about 3.2 wt. % to about 8.8 wt. % vanadium;

c) between about 2.7 wt. % to about 7.0 wt. % aluminum;

d) up to about 8.0 wt. % chromium e) up to about 5.0 wt. % zirconium;

f) up to about 0.02 wt. % to about 0.60 wt. % iron;

g) up to about 0.25 wt. % oxygen; and h) up to about 1.0 wt. % in total of carbon, hydrogen and nitrogen.

Under a highly preferred embodiment, the fastener insert of the present invention will be formed from a titanium comprising:

a) at least about 70.0 wt. % titanium;

b) between about 3.2 wt. % to about 8.8 wt. % vanadium;

c) between about 2.7 wt. % to about 7.0 wt. % aluminum;

d) between about 4.0 wt. % to about 9.0 wt. % chromium;

e) between about 0.02 wt. % to about 0.60 wt. % iron;

f) between about 0.1 wt. % to about 0.25 wt. % oxygen;

g) up to about 5.0 wt. % zirconium; and h) up to about 1.0 wt. % in total of carbon, hydrogen and nitrogen.

Commercially available titanium alloy compositions which are useful in forming titanium fastener inserts of the present invention are those having the trade designations Ti-6-4 and Ti-Beta-C which are available from Dynamet Incorporated.

To cold form the wire so as to have angled interior walls along a plurality of convolutions to provide a substantially diamond shape in cross section over at least a majority of the wire length, the feed rates of the wire must be carefully controlled. For example, feed rates for free running fastener inserts are generally carried out at rates of between about 10–20% lower as compared to rates for coiling stainless steel wire to prevent the titanium alloy from developing stress points or surface defects. While the resulting inserts can be of varying sizes, for industrial applications such as aerospace or automobile manufacturing, by way of non-limiting example, the inserts will generally have a length between about 0.2 to about 2.0 inches, outside diameters of between about 0.2 inches to about 2.0 inches, with length to outside diameter ratios generally being in the range of 1:1 to 3:1.

Once the titanium alloy wire is shaped and helically coiled to the appropriate size, the resulting coils are generally heat treated. This heat treatment is generally carried out in solution at temperatures of between about 780–940° C., e.g., 50–90° C. above the beta transition temperature for the alloy, for between about 10–60 minutes. In the event that heat treatment is not carried out in solution via immersion, it is preferred that such treatment be performed in a vacuum or in an inlet gas atmosphere so as to avoid the formation of an alpha which results from oxygen absorption. Upon heat treating, the body centered cubic beta phase is generally maintained. Thereafter, the coiled wire is generally aged at temperatures of between about 450–500° C. for 6 to 14 hours. This aging results in the precipitation of finely dispersed alpha phase components.

Optionally, after the titanium alloy wire is helically coiled to form the insert, the insert may be subjected to an electrolytic conversion coating process otherwise referred to herein as anodizing. To carry out the anodizing process, the fastener inserts should be cleaned with a non-halogenated solvent to remove all grease, oil, soap, alkali and other contaminants.

Upon cleaning, the inserts are preferably anodized by immersion in an electrolyte solution, generally containing Ni+ ions, whereby the insert serves as the anode and the bath tank serves as the cathode. The immersion of the inserts is preferably done with agitation to ensure that all air pockets have been dislodged. By anodizing the titanium inserts, the resulting inserts are more readily platable if desired and exhibit improved high temperature oxidation and stress corrosion properties.

The resulting titanium alloy fastener inserts of the present invention will preferably have a tensile strength of at least about 160,000 psi and may generally have a tensile strength as high as about 200,000 psi. Further, the titanium alloy fastener inserts will generally have a hardness on the order of at least about 35 HRC and a hardness range of approximately 35–50 HRC. As should be understood by those skilled in the art, HRC is a standard of hardness on the Rockwell C scale.

The titanium fastener inserts and, particularly, the anodized titanium fastener inserts of the present invention exhibit dramatic improvements in galvanic corrosion resistance as compared to stainless steel fastener inserts. To analyze the galvanic corrosion characteristics, titanium inserts were installed into aluminum 2024 conversion coated test blocks. A carbon steel bolt was assembled inside each titanium helical insert. The assembled aluminum blocks were then subjected to salt spray (fog) testing in accordance to ASTM B 117-97. The tests were conducted for 96 and 168 hours with an average volume of salt solution per 80 cm$^{2}$–1.7 ml/hr; an average concentration of salt solution (%) 4.9; and an average pH of salt solution 6.7.

After completion of the tests no corrosion was observed on the aluminum block or the titanium inserts. After completion of the tests, no corrosion was observed on the aluminum block or the titanium inserts. After disassembling the carbon steel bolts and sectioning the aluminum blocks along the axis of the threaded holes, no corrosion was observed between the aluminum block threads and the titanium insert threads. Very slight corrosion was observed only at the interface of the carbon steel bolts and the aluminum blocks, which took place only during the first 96 hours of testing. Similar results were achieved when the titanium inserts were tested in magnesium test blocks in salt spray (fog) testing.

As should be understood by those of ordinary skill in the art, the titanium alloy fastener inserts of the present invention provide a weight savings of generally at least about fifty percent as compared with stainless steel fastener inserts. The titanium alloy fastener inserts also have a high strength to weight ratio which is particularly important for applications in the aviation and aerospace industries, by way of non-limiting example. Still another advantage as demonstrated by the foregoing test results relates to the significant improvement in galvanic corrosion resistance as compared to commonly employed stainless steel fastener inserts.

While it will be apparent that the preferred embodiments of the invention disclosed are well calculated to fulfill the objects stated, it will be appreciated that the invention is susceptible to modification, variation and change without departing from the spirit thereof.

What is claimed is:

1. A fastener insert comprising a helically coiled wire body formed from an alloy comprising at least about 50.0 wt. % titanium and at least one other component selected from the group consisting essentially of nitrogen, carbon, hydrogen, iron, oxygen, aluminum, vanadium, tin, ruthenium, palladium, cobalt, molybdenum, chromium, nickel, niobium, zirconium, silicon, hafnium, bismuth, yttrium, copper, tantalum, boron, manganese and tungsten.

2. The fastener insert of claim 1 wherein said helically coiled wire has angled interior walls.

3. The fastener insert of claim 2 wherein said helically coiled wire has a substantially diamond shaped cross section.

4. The fastener insert of claim 1 wherein said helically coiled wire has about a 60° internal screw thread convolution.

5. The fastener insert of claim 1 wherein said helically coiled wire includes a selectively removable tang.

6. The fastener insert of claim 1 wherein said insert includes at least one notch.

7. The fastener insert of claim 1 wherein said insert has a tensile strength of at least about 160,000 psi.

8. The fastener insert of claim 1 wherein said insert has a hardness of at least about 35 HRC.

9. The fastener insert of claim 1 wherein said body is heat treated.

10. The fastener insert of claim 1 wherein said insert is anodized so as to provide said body with an outer layer of titanium oxide.

11. A fastener insert comprising a helically coiled body formed from an alloy comprising:
   a) at least about 60.0 wt. % titanium;
   b) between about 3.2 wt. % to about 8.8 wt. % vanadium;
   c) between about 2.7 wt. % to about 7.0 wt. % aluminum;
   d) up to about 8.0 wt. % chromium
   e) up to about 5.0 wt. % zirconium;
   f) up to about 0.02 wt. % to about 0.60 wt. % iron;
   g) up to about 0.25 wt. % oxygen; and
   h) up to about 1.0 wt. % in total of carbon, hydrogen and nitrogen.

12. The fastener insert of claim 11 wherein said helically coiled body has angled interior walls.

13. The fastener insert of claim 12, wherein said helically coiled body has a substantially diamond shaped cross section.

14. The fastener insert of claim 11 wherein said helically coiled body has about a 60° internal screw thread convolution.

15. The fastener insert of claim 11 wherein said helically coiled body includes a selectively removable tang.

16. The fastener insert of claim 11 wherein said insert includes at least one notch.

17. The fastener insert of claim 11 wherein said insert has a tensile strength of at least about 160,000 psi.

18. The fastener insert of claim 11 wherein said insert has a hardness of at least about 35 HRC.

19. The fastener insert of claim 11 wherein said body is heat treated.

20. The fastener insert of claim 11 wherein said insert is anodized so as to provide said body with an outer layer of titanium oxide.

* * * * *